(12) United States Patent
Todd

(10) Patent No.: US 8,381,201 B2
(45) Date of Patent: *Feb. 19, 2013

(54) PROCESSING OF EXPRESSIONS

(75) Inventor: Stephen James Todd, Hants (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,523

(22) Filed: Feb. 7, 2012

(65) Prior Publication Data

US 2012/0137276 A1 May 31, 2012

Related U.S. Application Data

(63) Continuation of application No. 12/030,221, filed on Feb. 13, 2008, now Pat. No. 8,161,468.

(30) Foreign Application Priority Data

Feb. 13, 2007 (EP) .................................. 07102234

(51) Int. Cl.
 *G06F 9/45* (2006.01)
 *G06F 9/44* (2006.01)
(52) U.S. Cl. .................... 717/143; 717/140; 717/142
(58) Field of Classification Search .......... 717/140–146, 717/148, 150–152
See application file for complete search history.

(56) References Cited

U.S. PATENT DOCUMENTS

| | | | |
|---|---|---|---|
| 5,021,947 A | 6/1991 | Campbell et al. | |
| 5,287,490 A | 2/1994 | Sites | |
| 5,535,391 A | 7/1996 | Hejlsberg et al. | |
| 5,560,015 A * | 9/1996 | Onodera | 717/143 |
| 5,613,117 A * | 3/1997 | Davidson et al. | 717/144 |
| 5,835,771 A | 11/1998 | Veldhuizen | |
| 6,378,126 B2 | 4/2002 | Tang | |
| 6,397,383 B1 * | 5/2002 | Chang et al. | 717/142 |
| 6,578,197 B1 | 6/2003 | Peercy et al. | |
| 6,772,413 B2 | 8/2004 | Kuznetsov | |
| 7,089,542 B2 * | 8/2006 | Brand et al. | 717/143 |
| 7,093,231 B2 | 8/2006 | Nuss | |
| 7,340,732 B2 | 3/2008 | Gu | |
| 7,376,939 B1 | 5/2008 | Nayak et al. | |
| 7,426,721 B1 * | 9/2008 | Saulpaugh et al. | 717/144 |
| 7,480,856 B2 | 1/2009 | Jones | |
| 7,584,461 B2 * | 9/2009 | Plum | 717/143 |

(Continued)

FOREIGN PATENT DOCUMENTS

| | | |
|---|---|---|
| JP | 10228477 A | 8/1998 |
| JP | 2002073662 A | 3/2002 |

OTHER PUBLICATIONS

Porkolab et al, "Domain specific language integration with compile time parser generator library", ACM GPCE, pp. 137-146, 2010.*

(Continued)

*Primary Examiner* — Anil Khatri
(74) *Attorney, Agent, or Firm* — Cuenot, Forsythe & Kim, LLC

(57) ABSTRACT

In many messaging systems, message selection filtering involves a significant processing overhead. This includes the parsing and preparing of the message selection filters in readiness for evaluation, as well as the evaluation itself. In systems which involve parsing and prepare processing for expressions that include repeated patterns (such as in many JMS environments), a template-based shortcutting of the conventional processing improves performance. A stored parsing template is used to parse an input sequence such as a received data processing instruction. The parse is used to identify expressions of a first type that can then be implicitly optimized by using a stored evaluation template that is associated with expressions of that type.

18 Claims, 5 Drawing Sheets

U.S. PATENT DOCUMENTS

| | | | |
|---|---|---|---|
| 7,590,644 B2 | 9/2009 | Matsakis et al. | |
| 7,594,221 B2 | 9/2009 | Bhushan et al. | |
| 7,596,523 B2 | 9/2009 | Sobel et al. | |
| 7,607,120 B2 | 10/2009 | Sanyal et al. | |
| 7,636,914 B1 | 12/2009 | Johnson | |
| 7,665,075 B1* | 2/2010 | Daynes et al. | 717/148 |
| 7,673,293 B2 | 3/2010 | Sanyal | |
| 7,752,609 B2* | 7/2010 | Rioux | 717/141 |
| 7,818,729 B1* | 10/2010 | Plum et al. | 717/140 |
| 7,818,732 B2 | 10/2010 | Guan | |
| 7,856,624 B2* | 12/2010 | Plum | 717/140 |
| 7,926,046 B2 | 4/2011 | Halambi et al. | |
| 7,941,791 B2* | 5/2011 | Wang et al. | 717/140 |
| 8,056,065 B2 | 11/2011 | Eichenberger et al. | |
| 8,087,010 B2* | 12/2011 | Eichenberger et al. | 717/150 |
| 8,087,011 B2* | 12/2011 | Eichenberger et al. | 717/151 |
| 8,103,758 B2* | 1/2012 | Miura et al. | 709/223 |
| 8,156,474 B2* | 4/2012 | Teplitsky et al. | 717/124 |
| 8,166,465 B2* | 4/2012 | Feblowitz et al. | 717/143 |
| 8,181,167 B2* | 5/2012 | Zhao | 717/143 |
| 8,266,604 B2* | 9/2012 | Groff et al. | 717/146 |
| 2007/0016897 A1 | 1/2007 | Todd | |

OTHER PUBLICATIONS

Hu et al, "Research of self adaptive web page parser based on template and rules", IEEE, pp. 1-4, 2009.*

Ordentlich et al, "Discrete univeersal filtering through incremental parsing", IEEE DCC, pp. 352-361, 2004.*

Takase et al, "Lazy XML parsing/serialization based on literal and DOM hybrid representation", IEEE, pp. 295-303, 2008.*

Kuhn, J., "Processing Optimality-theoretic Syntax by Interleaved Chart Parsing and Generation," ACM Digital Library, In Proc. of 38th Annual Mtg. on Association for Computational Linguistics, pp. 368-375, 2000.

Lu, W., et al., "A Parallel Approach to XML Parsing," IEEE, In Proc of the 7th IEEE/ACM Int'l. Conf. on Grid Computing, pp. 223-230, 2006.

Liu, T., et al., "Dependency Parsing Based on Dynamic Local Optimization," ACM Digital Library, In CoNLL-X Proc. of 10th Conf. on Computational Natural Language Learning, pp. 211-215, 2006.

Manaka, K., et al., "Static optimization of XSLT stylesheets: Template Instantiation Optimization and Lazy XML Parsing," In ACM Symposium on Document Engineering, pp. 55-57, Oct. 2006.

Ronselle, P., "Implementing the JMS Publish/Subscribe API," Dr. Dobb's Journal, vol. 27, No. 4, pp. 28-32, Apr. 2002.

Takase, T., et al., "An Adaptive, Fast and Safe XML Parser Based on Byte Sequence Memorization," Proc. of 14th Int'l. Conf. on World Wide Web (WWW2005), pp. 692-701, May 10-14, 2005.

* cited by examiner

PROCESSING OF EXPRESSIONS

CROSS-REFERENCE TO RELATED APPLICATIONS

[0000.1] This application is a Continuation of U.S. application Ser. No. 12/030,221, filed on Feb. 13, 2008, which claims the benefit of European Patent Application No. EP 07102234.7 filed on Feb. 13, 2007, which is incorporated herein by reference in its entirety.

BACKGROUND OF THE INVENTION

The present invention relates to improvements in processing of expressions that provide efficient handling of message selection filters in a messaging network.

Message oriented middleware (MOM) is commonly used to transfer data between application programs that may be running on remote data processing systems in a distributed, heterogeneous network. The middleware can shield the application programs from much of the complexity of the routing and format transformations that are required for a successful data transfer, while implementing recovery features and other reliability features.

One well established messaging model is asynchronous point-to-point messaging, in which messages are initially placed by a sender application onto a queue managed by a message handling program that is local to the sender. The message is then transferred across the network by interoperating message handling programs using information within the message header, and finally placed onto an input queue of the target application. The target application retrieves the message when it is ready to process it. An advantage of point-to-point messaging is the non-blocking nature of asynchronous communications. Both the sender and receiver can work on other tasks while the message transfer takes place. The receiver is not required to be available when the sender sends the message and the sender is not required to be available when the target receiver receives the message.

Another well established messaging model is publish/subscribe, in which a published message can be sent to multiple subscribers that have registered their interest in receiving publications such as the particular message. If publishers send their publications to a publish/subscribe message broker, and subscribers register their requirements with the broker (typically specifying topics of interest that the broker can compare with topic information in published message headers), the publishers and subscribers do not need to identify each other. Some publish/subscribe message brokers are used in association with underlying message queues.

Many commercially available MOM products implement the Java Message Service (JMS). JMS is a Java specification (developed under the Java Community Process defined by Sun Microsystems Inc.) defining an API for use in sending messages between MOM clients. JMS permits message selection by filtering on message properties and message header information. JMS allows great flexibility in the setting of headers and filters, so JMS message handlers need to be able to support this flexibility. Because of this requirement to be able to handle custom message header fields and filters, it has not been possible in a JMS environment to prepare and save filter expressions in an optimized format. Partly for this reason, typical JMS implementations are not optimized for high performance and, in particular, the tasks of parsing and preparing new filter expressions have a negative impact on performance. (Java is a registered trademark of Sun Microsystems, Inc.)

The typical process implemented for message filtering can be divided into a number of steps including:

1. parsing the filters to extract information which is useful for message filtering;
2. preparing the filters for an efficient filter evaluation (for example, transforming them from an SQL-like syntax to a new format);
3. parsing message headers and message properties of received messages; and
4. comparing the message headers/properties of the received messages with the filters to identify matching messages (referred to as evaluating the filter expressions).

BRIEF SUMMARY OF THE INVENTION

There is a need for efficiency improvements within the filter parsing step and within the prepare step of a message selection process. These two steps are often very significant to JMS messaging performance, especially in some point-to-point scenarios where the system is frequently presented with new filters. In one example scenario, a queue is shared between many running processes (or process instances) and filter expressions are used to determine which processes handle which messages. A common example is a shared reply-to queue, where each instance selects its reply messages either by a correllation identifier (CorrelId) or by some instance identifier (InstanceId). Each InstanceId or CorrelId requires a new filter. The need for more efficient parsing and preparation of expressions is a general problem that is not limited to JMS publish/subscribe message filters.

The present invention may be implemented as a method for improving process of expressions in the data processing system. A data processing instruction is parsed using a parsing template that defines elements of a first type of the expression that can be evaluated to control a conditional data processing operation. The parsing identified elements including expression parameter values. An evaluation template representing the first type of the expression is selected in a form that is optimized for evaluation. Parameter values identified by the parsing step are inserted into the evaluation template to generate optimized evaluation code. The optimized evaluation code is used to evaluate the expression.

The invention may also be implemented as a data processing apparatus that includes a data processing unit, a data storage unit for storing a set of templates, and a template-based parser for controlling the data processing unit to parse an input data processing instruction. Parsing is performed using a stored parsing template that defines elements of a first type of expression that can be evaluated to control a conditional data processing operation. The parsing identified elements of an expression of the first type including expression parameter values. The data processing apparatus further includes names associated with the template-based parser for selecting stored evaluation template that represents the first type of the expression in a form that is optimized for evaluation. Apparatus also includes means for inserting identified parameter values and to the evaluation template to generate optimized evaluation code that is used to evaluate the expression.

The invention may also be implemented as a computer program product for performing processing of expressions in the data processing system. The computer program product includes a computer usable media embodying computer usable program code configured to parse a data processing instruction using a parsing template that defines elements of a first type of expression that can be evaluated to control a conditional data processing operation. The parsing identifies elements of an expression of the first type including expression parameter values. The computer program product further includes computer usable program code configured to select an evaluation template representing the first type of expression in a form that is optimized for evaluation, to insert identified parameter values into the evaluation template to generate optimized evaluation code and to use the optimized evaluation code to evaluate the expression.

The invention allows reuse of an evaluation template representing the first type of the expression which is recognized as applicable to filter expressions for more than one selection filter, avoiding repetitive parsing and template generation and thereby optimizing the processing of selection filters.

DETAILED DESCRIPTION OF THE INVENTION

Figure 1:
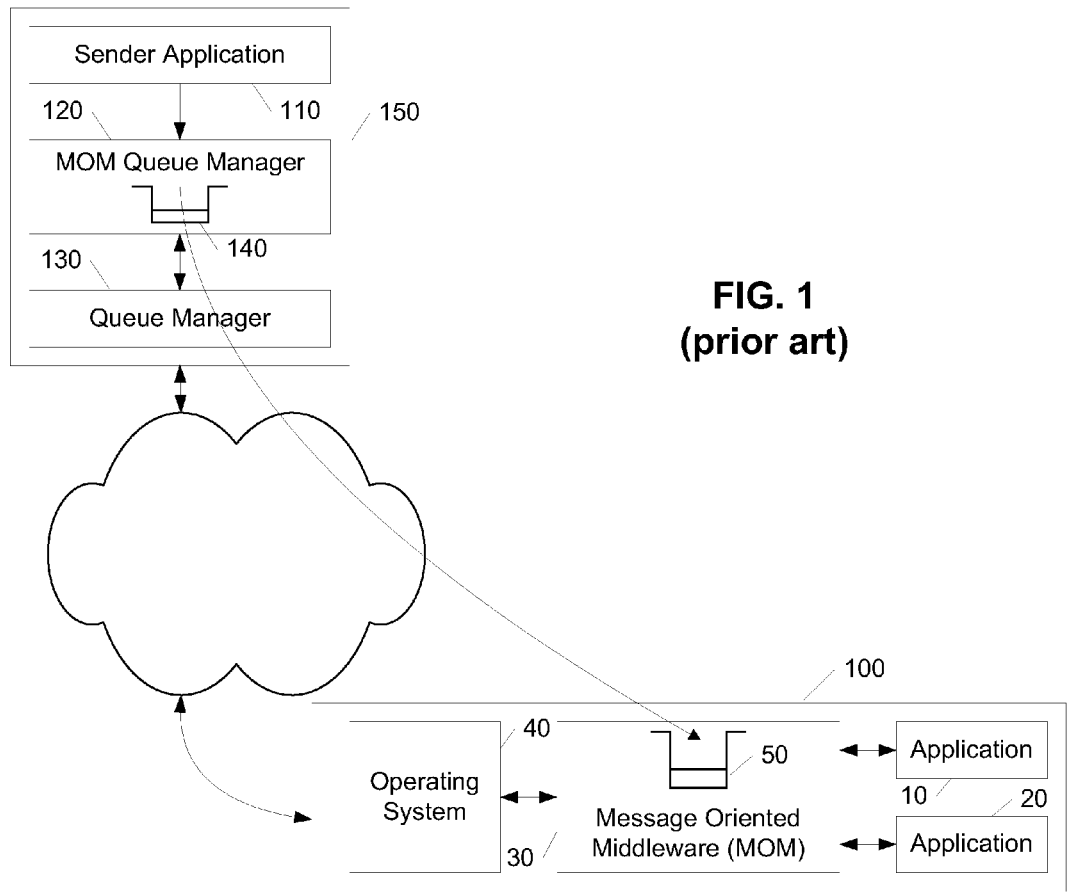
FIG. 1 is a schematic representation of a message transfer in a point-to-point messaging network, as already known in the art.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention uses a stored parsing template to parse an input sequence such as a received data processing instruction. The parsing template is preferably held within a tree structure in which elements of a set of parsing templates are each associated with a node of the tree. A comparison of the input sequence with the template tree is used to identify a matching parsing template and simultaneously to parse the input sequence using the matching parsing template. For example, the input sequence may be a string or byte array or byte stream specifying an expression that needs to be evaluated to control a conditional data processing operation. The parse is used to identify expressions of a first type that can then be implicitly optimized by using a previously stored evaluation template that is associated with expressions of that type. That is, the inventor of the present invention has recognized that a template-parse can be exploited more fully than has been done in known systems—inferring information from the parsing step to enable a shortcutting of the subsequent prepare step.

As is known in the art, a prepare step may comprise transforming expressions from an original syntax into a format that can be evaluated more efficiently. For example, within a JMS-implementing MOM product, filter expressions specified for a new JMS message consumer may be transformed from an original syntax (which is similar to an SQL "where" clause) into a format that is optimized for processing by the MOM product's internal program code. In alternative applications, a prepare step may comprise transforming from XQuery (the XML Query Language) or from another XML-formatted query syntax into a different format. The present invention avoids repeating the prepare steps by selecting a pre-prepared template that represents the identified expression in a form optimized for evaluation.

This combination of simplification of the parsing step and shortcutting of the prepare step(s) reduces the performance overheads associated with processing expressions. The expressions may be, for example, message selection filter expressions or transformation expressions. The message selection filtering may be implemented in a point-to-point or publish/subscribe messaging system in which subscribers and other message receivers can specify filter expressions. For example, a subscriber application may specify particular message headers or properties for messages they wish to receive, and messages which do not have those headers or properties will not be passed to the subscriber application. This use of filters may be additional to or instead of the use of subscriber-specified message topics.

The invention is particularly beneficial in a JMS message selection filtering process, because JMS does not allow for completely predefined message processing such as a predefined explicit 'prepare' operation, and because JMS implementations that use XML and SQL-like conditional expressions would suffer from inefficient evaluation of their filter expressions unless an optimization ('prepare') step is performed. As noted above, JMS and XML provide great flexibility but supporting this flexibility and the verbose nature of XML can lead to a number of performance problems.

Embodiments of the present invention mitigate these problems by exploiting repetition of patterns. Expressions such as JMS message selection filter expressions need to be evaluated repeatedly in many messaging systems, and this processing overhead can be reduced by recognizing patterns (i.e. repeated elements) within these expressions. Repetition of patterns within the headers and properties of received messages can also be recognized and exploited. The exploitation of this repetition involves generating, saving and reusing optimized expression evaluation templates and message parsing templates. If the templates do not match, conventional parse and prepare steps can be performed, and the results of those conventional operations can be used to generate new templates. In such an embodiment, there is no inherent loss of ability to handle unusual filters and unpredictable message headers but increased efficiency is possible when patterns are repeated.

Embodiments of the invention described below include improved JMS message selection mechanisms. As noted above, the invention is not limited to JMS and may be applied to other environments in which patterns are repeated within the expressions that are evaluated to determine whether a data processing operation should proceed. The expressions may be, for example, message selection filter expressions or expressions controlling message transformation and these examples are described in more detail below. As will be clear from a brief reference to FIGS. 1 to 4 and the accompanying description below, the present invention is implementable in both point-to-point messaging and publish/subscribe messaging solutions.

One embodiment of the invention comprises parsing an input string including an expression that is to be repeatedly executed, and saving the parsed result in an optimized form that can be used for expression evaluation. This optimized form may for example be: (a) an expression tree, (b) bytecodes, or (c) machine code. In the case of JMS, the string expression is based on the SQL92 conditional expression syntax. This template-based parsing and optimization of expressions may be combined with a template-based parsing of a received communication, to extract data that is relevant to the evaluation of the expression (for example, extracting information from JMS message headers and/or message properties).

In one embodiment, the template-based parser compares a data processing instruction with a parsing template tree. Elements of a set of parsing templates are each associated with a node of the tree. If the parsing template tree includes a matching parsing template, the template-based parser parses the data processing instruction using the matching parsing template. However, if the parsing template tree does not include a matching parsing template, a second parsing process is used to parse the data processing instruction to identify elements of an expression, and an explicit prepare process is performed on the identified expression elements to generate optimized evaluation code. The data processing apparatus preferably also includes means for deriving a parsing template from the result of parsing by the second parsing process, means for deriving an evaluation template from the result of processing by the prepare process, and means for saving the derived parsing template and the derived evaluation template in the data storage means. The derived parsing template is preferably saved in association with a leaf node of the parsing template tree, and the derived evaluation template is saved in association with the same leaf node. In one embodiment, a template-based parser accesses a second template tree to parse the received data communication prior to evaluating the expression.

A messaging system 100 of the type in which one embodiment of the invention may be implemented is described below with reference to FIG. 1. The system 100 combines conventional data processing system hardware features (not shown) and software including a set of application programs 10, 20 interfacing with a message oriented middleware (MOM) program 30. The MOM obtains support from the underlying operating system 40. The MOM program 30 implements asynchronous point-to-point messaging via message queues. A sender application program 110, which may be located on a remote data processing system 150, is able to make an API call that places a message onto a local message queue 140 managed by its local MOM queue manager 120. A plurality of MOM queue managers that are distributed across a physical network interoperate to handle transfer of the message to a queue 50 managed by the local MOM queue manager 30 of the target application program 10. Only a few queue managers are shown in FIG. 1, but there may be many systems involved in the delivery of a particular message. The interoperating MOM products handle the complex problems of network routing and transactional assured delivery via a heterogeneous network, such that the message can be processed by the target application program 10 when the target application is ready. The application program 10 issues an API call to retrieve the message from its input queue 50 and the queue manager 30 responds by passing the message to the application program 10. Assuming the retrieval is successful, the message is deleted from the queue 50. This asynchronous approach to transferring messages via queues is well known in the art.

In one known messaging environment, the queue 50 is shared between two processes 10,20 which may be separate instances of the same application program. For example, the queue 50 may be a shared 'replyTo' queue, from which each application instance selects its respective reply messages. The selection may be based on correlation identifiers (see below) or some instance identifier, but in either case the selection requires an expression to be evaluated to determine whether messages held on the queue match the requirements of the particular application instance.

Figure 2:
FIG. 2 represents an example message structure, as already known in the art.
Figure 3:
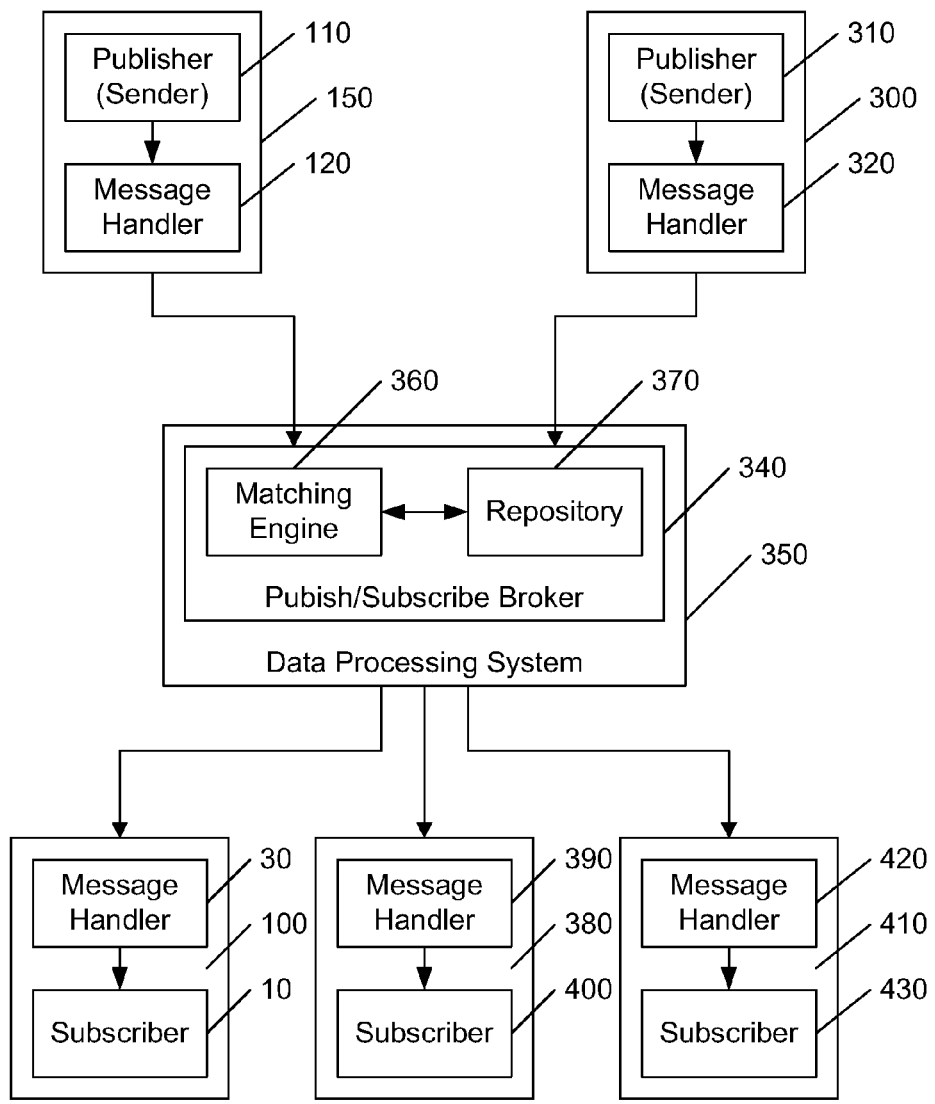
FIG. 3 is a schematic representation of a publish/subscribe network, as already known in the art.

Referring to FIG. 2, in JMS, messages include:

a message header 200, with fields 210,220,230 containing values that are used by both sender and receiver clients and by JMS providers to identify and route messages;

a message properties field 240 for supporting application-defined property values that can be used in application-defined message filtering (properties may be thought of as application-specific header fields); and a message body 250 (or 'payload'), that contains the application data that is being sent and that may be one of five types—Stream, Map, Text, Object or Bytes.

A JMSCorrelationID header field within the message header can be used for linking one message with another, such as for linking a reply message with its requesting message. For example, the correllation identifier can provide the basis for a message selection in a point-to-point messaging implementation in which multiple application instances are servicing the same 'replyTo' queue. A JMS Consumer application is able to specify the messages it is interested in, via message header field references and property references within a message 'selector'. A JMS message selector is a conditional message selection filter expression, normally specified as a string whose syntax is based on a subset of the SQL92 conditional expression syntax. The expression evaluates to "true" when a received message's header field values and property values match corresponding elements within the selector. The selector is evaluated on behalf of the JMS Consumer (a messaging application) by a JMS Provider (a MOM product). Thus, only messages whose header fields and properties match the selector are delivered to the Consumer.

Message selection filtering based on header fields and properties can be essential to a JMS publish/subscribe implementation as well as to point-to-point messaging examples such as mentioned above. A known type of publish/subscribe network is shown schematically in FIG. 3. Publisher applications 110,310 send messages (via local message handling (queue manager) programs 120,320 and available network connections) to a publish/subscribe broker 340 running on a data processing system 350. The publish/subscribe broker includes a matching engine 360 and a repository 370 holding subscription information on behalf of a set of subscribers (applications 10,400,430 or respective local message handling programs 30,390,420). In this example publish/subscribe network, the filtering can be implemented within the matching engine 360 of the broker 340.

Alternative publish/subscribe networks implement subscription matching including filtering on message properties within matching components that are local to the subscriber applications instead of within a broker located at an intermediate network hub. The present invention is applicable to each of these publish/subscribe and point-to-point communication models including JMS implementations of the various models.

Figure 4A:
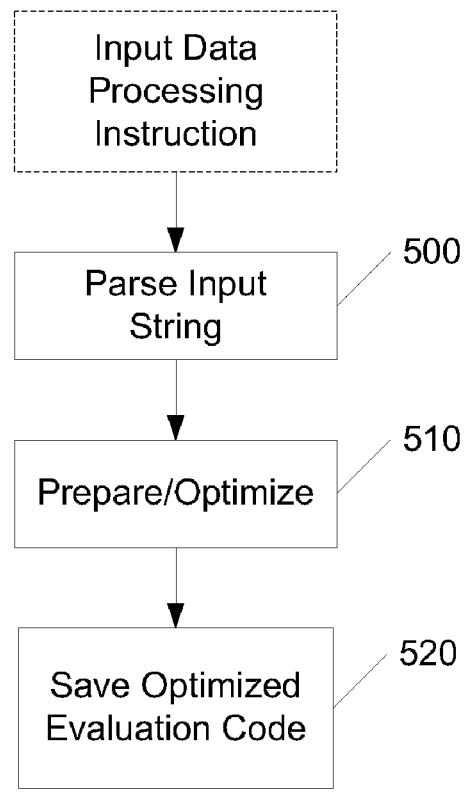
FIG. 4 consists of FIG. 4A illustrating conventional processing of an input data processing instruction, such as for preparing a filter expression for evaluation, and FIG. 4B illustrating the corresponding evaluation for an input message.

In a typical JMS environment, the processing of message selection filters is costly. Referring to FIG. 4A, each time an application program instance is created using the call session.createConsumer( . . . , selector), the JMS provider (i.e. the MOM product implementation of the JMS interface) has to parse 500 the application instance's selection filter(s) and prepare 510 the filter(s) for evaluation. The selection filter is then saved 520 for use in subsequent evaluations.

Figure 4B:
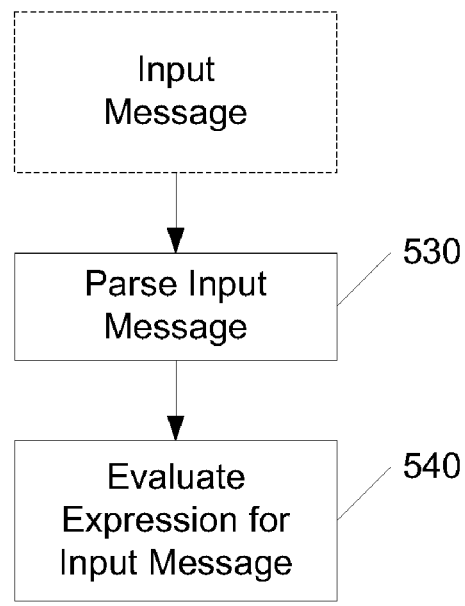

Referring to FIG. 4B, each time an application program instance 10 attempts to retrieve a message from the input queue 50, the JMS provider has to parse 530 the JMS message headers and properties for a particular message and evaluate 540 the saved filter expression to determine whether the message matches the application instance's requirements.

If the filter expression evaluates to "true", the message is retrieved by the particular application instance. If the expression evaluates to "false", the application instance moves on to inspect the next message on the queue.

Thus, using the conventional method, the filter expression is parsed once for every performance of the createConsumer( ) operation, and the prepare operation is performed once per createConsumer( ) operation. A separate message parse operation is performed once for each message inspected on the queue.

There is considerable repetitive processing performed in a typical JMS messaging environment. By identifying and exploiting patterns, using templates to perform an efficient parse and an automatic prepare of a filter expression, the processing overhead associated with JMS message selection filter expressions can be reduced.

In a first embodiment of the present invention, a template-based parse is performed on the JMS selection filter that is specified when creating a new JMS Consumer. That is, stored templates representing previously-identified types of expression are compared with the selection filter. If a match is identified, the matching process includes using the matching template in a template-based parse that identifies elements of expressions of a known type and extracts parameter values ("constants") from the expressions. Having identified such an expression, a previously-stored optimized evaluation template is selected and used in the evaluation of the expression. The extracted parameters are inserted into the evaluation template to form optimized evaluation code. Thus, by generating and storing templates representing common types of expression, it is possible to shortcut both the parsing and prepare steps associated with the creation of a new JMS Consumer.

Additionally, when messages are received onto an input queue of the JMS Consumer, another template-based parse is performed on message headers and properties of received messages. That is, stored templates representing previously-identified patterns within message headers or properties are used to simplify parsing of an incoming message.

This efficient template-based parsing, and the associated inference of information for an automated prepare step, is achieved without sacrificing the flexibility of being able to handle new filters and a wide range of message headers and properties. If a message selection filter or the headers/properties of a received message do not match one of the stored templates, conventional parsing, prepare and evaluate steps are performed. The results of these conventional parse and prepare steps can then be used to generate new templates for later use. Additional information about template based parsing are available in commonly-assigned, co-pending US Patent Application Publication Number 20070016897.

Although the present invention is applicable to other environments and other types of expressions, the example of pre-processing and evaluating JMS selection filters is described below in more detail, with reference to FIGS. 5, 6A and 6B.

Figure 5:
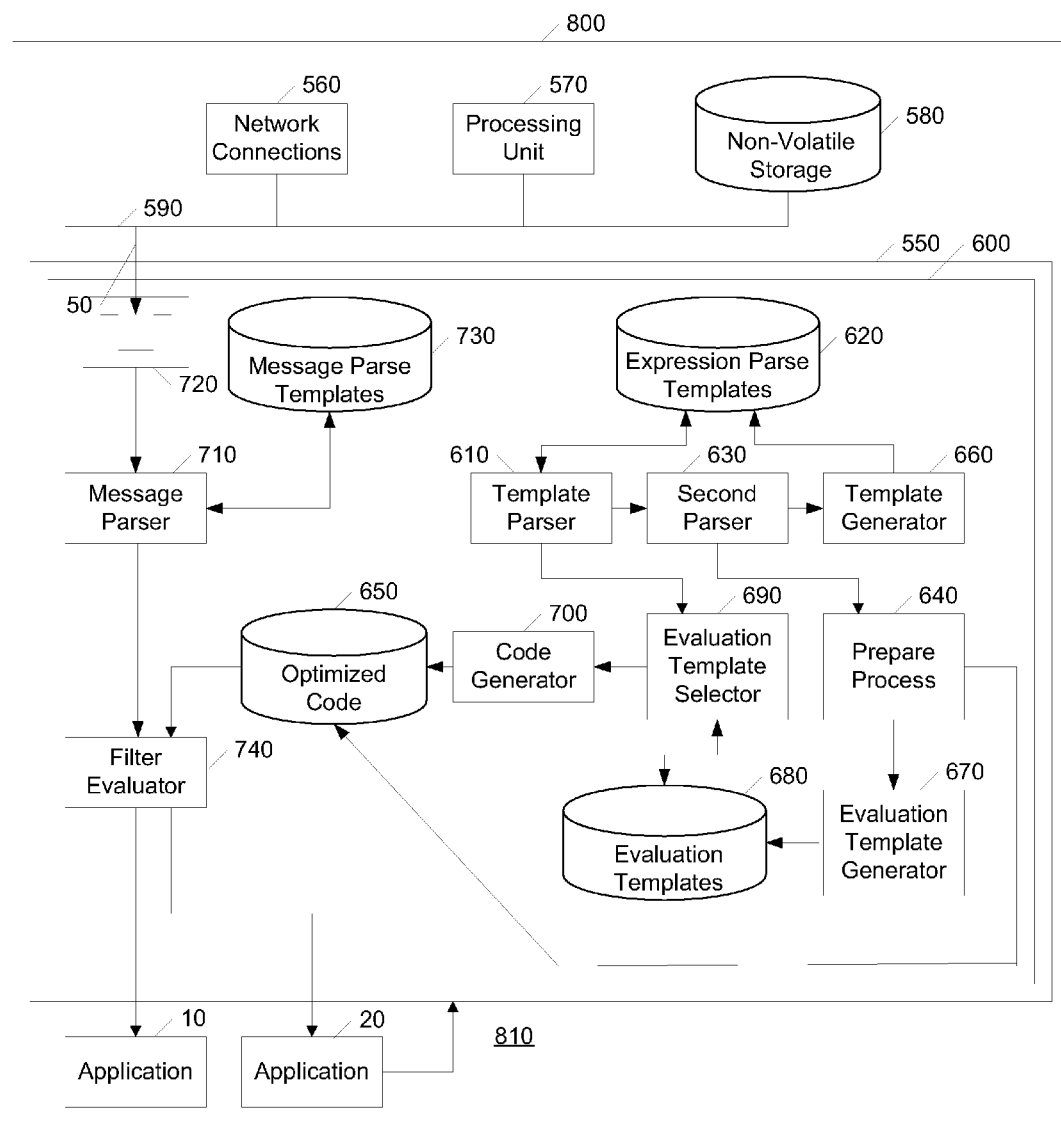
FIG. 5 is a schematic representation a data processing system according to an embodiment of the invention.
Figure 6A:
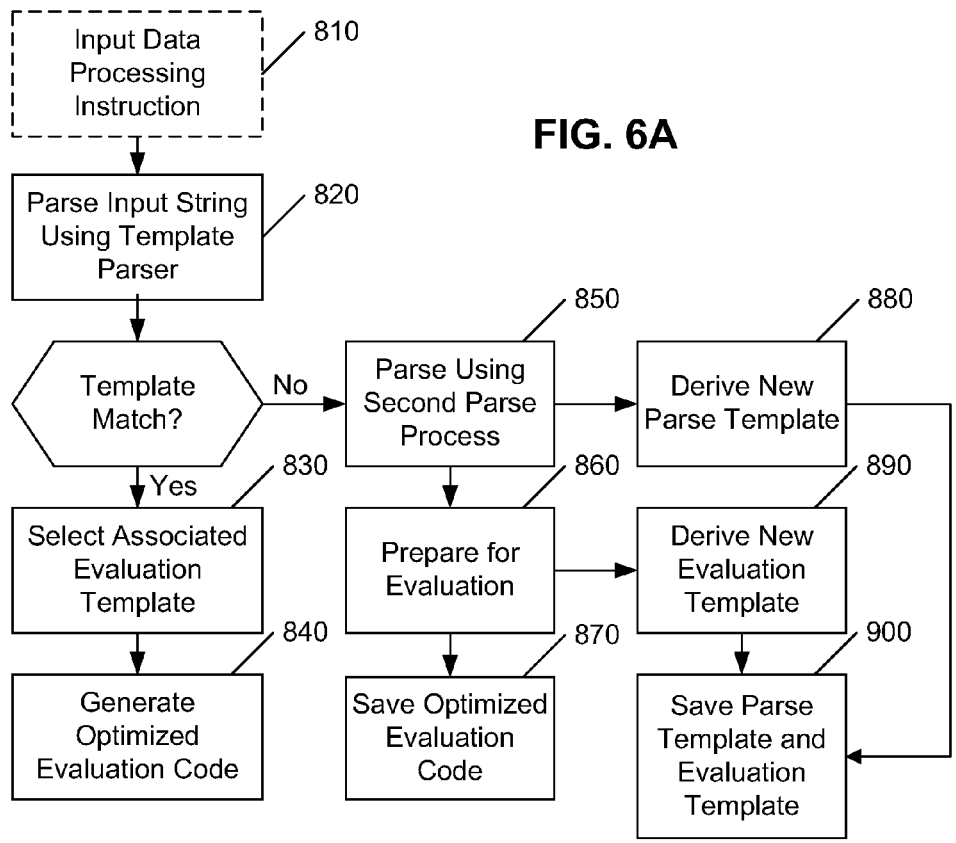
FIG. 6 consists of FIG. 6A illustrating a sequence of steps of a method for preparing optimized evaluation code according to an embodiment of the invention, and FIG. 6B illustrating the corresponding evaluation of an input message.

FIG. 5 is a schematic representation of components of a first embodiment of the invention, within a network-connected data processing system 800 comprising a data processing unit 570, main memory 550, non-volatile storage 580, input/output network connections 570, and an internal communications bus 590. In this first embodiment, the invention is implemented using a various data repositories and executable components of a JMS provider (a MOM product) 600 within the system memory 550. The JMS provider 600 provides support to conventional JMS consumer applications 10,20 that also run in the system memory. The operations performed by the various components shown in FIG. 5 are described below with reference to FIGS. 6A and 6B.

In the first embodiment of the invention, when an instruction 810 to create a new JMS consumer session.createConsumer( . . . , selector) is received by a JMS provider 600, the instruction is initially passed to a template parser 610. The template parser accesses 820 a template tree 620 representing a set of stored templates and compares 830 the input string with the set of parsing templates that are currently represented within the template tree 620. The set of templates includes at least one template for handling 'selectors'—i.e. a template for handling the filter expressions that are typically included in an instruction to create a new JMS message consumer.

If there is no available matching template, the selector within the create instruction is parsed 850 by a second parser 630 in a conventional manner. This parse compares the input string with known syntax rules to determine the structure of the selector and to enable its evaluation for message selection filtering—identifying the various expression parameters including common parameter types and their data values and then putting them into a data structure that can be processed. A prepare process 640 is performed 860 on the parsed result to prepare the selector for more efficient evaluation processing. This is a conventional step that typically involves transforming the structure or syntax of the parsed input string into a new format that will enable more efficient processing—in this case efficient message selection filter evaluation.

In the case where no matching parse template is identified, the parse and prepare steps 850,860 are performed as described above and then the results are saved 870 as optimized evaluation code 650. In this preferred embodiment, the results of the parse are also input to a parsing template generator 660 to generate 880 a new parsing template. The results of the prepare step are passed to an evaluation template generator 670 to generate 890 a new expression evaluation template. The new parsing template is a representation of identified parameters of the selector expression, but with the data values of these parameters left blank. The new expression evaluation template is derived from the parsing template and the transformed expression that was generated during the previous prepare step. Any newly generated parsing templates are added 900 to the parsing template tree 620, and new expression evaluation templates are added 900 to a separate store 680 of expression evaluation templates. In this embodiment, the new expression evaluation templates are associated with respective parsing templates by associating each expression evaluation template with a leaf node of the parsing template tree 620.

Thereafter, when a new JMS Consumer is defined with a similar selector, the repeated pattern of parameters can be recognized and parsed 820 using the new parsing template. That is, when a selector specified within a new instruction session.createConsumer( . . . , selector) is passed to the template parser 610, the template parser compares 820 the new selector with the set of templates represented in its template tree 620. The new parsing template is identified as a match and is used 820 to analyze the structure of the selector and to extract parametric information for the selector's filter expression. Since an expression evaluation template has already been created for filter expressions of this type, there is no need to perform any new explicit prepare step or to create a new evaluation template. Instead, the previously-saved expression evaluation template (which already represents this type of expression in a format that can be evaluated efficiently) can be selected 830 by an evaluation template selector 690 for evaluating the new message selection filter expression. For example, the SQL-like syntax of a JMS filter expression has been replaced in a stored expression evaluation template with a different syntax that is more efficiently processed by the respective MOM program code.

Information inferred from a successful template-based parsing step 820 enables selection 830 of an appropriate one of a set of stored expression evaluation templates. The parse step 820 also extracts parameters that can be combined 840 with the evaluation template by a code generator 700 to generate optimized evaluation code. In this way, recognition of a repeated pattern has enabled reuse of the results of a previous parse and reuse of a previous preparation of an efficient execution path—preparing for the evaluation step with less processing than conventional solutions.

For example, if a JMS message selection component sees a filter expression:

E-filter1: "JMSCorrelId='abc' and ZZZ='zxc'"

the message selection component can parse the filter expression and then explicitly perform prepare processing to generate optimized evaluation code that can be represented as follows:

Opt-code1: MQCorrelId::abc [[ZZZ::zxc]]

This provides a representation of the filter expression in a form that is suitable for evaluation, but has not yet enabled any reuse or saved any processing overhead. The message filter expression can also be processed to create a parse template that will recognize repetition of elements of the expression, as follows:

E-parse template1: JMSCorrelId='% 1%' and ZZZ='% 2%'

The message selection component can then associate this parse template with an evaluation template that is related to the optimized evaluation code and is optimized for the use of a particular evaluation function:

E-evaluation template1: MQCorrelId:: % 1% [[ZZZ:: % 2%]]

associated with JMSCorrelId='% 1%' and ZZZ='% 2%')

In this illustrative example, the use of symbols '::' and '[[ ]]' indicates an efficient internal representation that can be used to test messages retrieved from a MOM system by a 'GetMessage' operation.

The parsing of the initial filter expression will extract parameters that could be inserted into the evaluation template, and these may be represented as follows:

E-inserts1: →E-evaluation_template1 % 1%=abc % 2%=zxc where the representation '→E-evaluation template1' indicates that these inserts are for use with template 'E-evaluation template1', and where the insert values are 'abc' and 'zxc').

In the above example, the parsed expressions are separated into parts that are common to all expressions of that type (which parts can be represented in a template) and variable parts (the inserts). The common parts typically include the field names (such as 'JMSCorrelId') and operators (such as '=' and 'and') whereas the inserts typically include the 'constants' within the expression (i.e. the values that vary between different instances of a particular type of expression).

In alternative embodiments of the invention, there may be a different set of rules for determining which elements of an expression should be part of a template and which should be handled as inserts. For example, it may be beneficial to recognize JMSPriority as a special case, treating the subexpression 'JMSPriority=1' as part of a template and distinct from 'JMSPriority=2'. Furthermore, the above-described embodiments are merely illustrative in the sense that many different examples of prepare processing are known in the art.

The example evaluation template described above represents an optimization because a selection by correlation identifier can now be handled by reference to a standard message header field (MQCorrelId::) that can be efficiently accessed by the MOM product code. Some MOM products include a JMS layer overlying the internal message handling functions. Some of the standard message header fields include the same information as the corresponding parameter of the original filter expression, but in a different format that allows more efficient evaluation. In this illustrative example, a standard header field duplicates an extended JMS header, so the standard header field can be used by the MOM product when retrieving a message from a shared input queue using 'GetByCorrelId=abc', or when selecting on priority or user-ID. An element of the original JMS selection filter expression has been replaced by an equivalent element that has a different syntax and can be evaluated efficiently by the MOM product code.

As well as being adapted to check different header fields, an evaluation template may be generated that allows a MOM product's existing API call options or internal indices to be used to perform filtering (using such parameters as MessageId, CorrelId and GroupId). The cost of passing failing messages from the underlying MOM product code to the JMS layer can also be saved in this case.

Although known solutions can explicitly perform prepare processing, performance improvements are possible using the template-based shortcuts of the present invention which identify repeated patterns to allow reuse of evaluation templates. The use of a template-based parse and pre-stored evaluation templates enables an implicit and automated optimization of an input expression which, in this example embodiment, simplifies parsing and avoids repeated prepare processing and 'pushes down' filters for lower-level evaluation.

With this embodiment of the invention, when a second similar expression is subsequently seen by the JMS message selection component, such as in the example:

E-filter2: s.createConsumer( . . . , "JMSCorrelId='def' and ZZZ='vbn'")

this will be identified as matching the parse template 'E-parse template 1' with E-inserts2: →E-evaluation_template1 % 1%=def % 2%=vbn As a result of this match, the JMS message selection component will automatically associate the optimized expression evaluation template 'E-evaluation_template1' with the second filter expression, inheriting the result of all the processing work associated with creating the expression evaluation template. Not only is the parse step simplified, there is no need to prepare and optimize a new filter.

The above-described processing efficiently prepares optimized evaluation code for message selection:

Opt-code2: MQCorrelId::def [[ZZZ::vbn]]

Although the optimized evaluation code (Opt-code2) corresponding to the second filter (E-filter2) is the same as would have been generated using the repetitive processing of known techniques, the optimized evaluation code has been generated without repeating the prepare processing. The benefit of this avoidance of repetitive processing can be significant in environments that exhibit significant repetition.

Figure 6B:
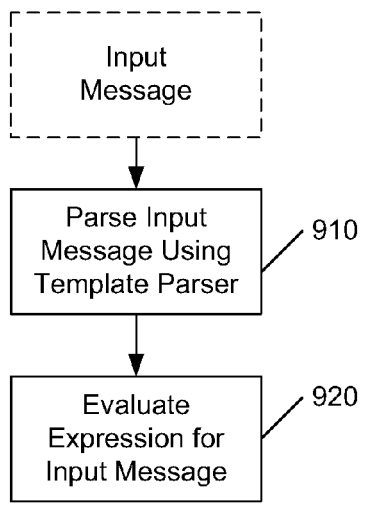

Described below with reference to FIG. 6B is the additional processing which is performed on receipt of a new input message for which the filter expression needs to be evaluated. Messages are received via the data processing system's network connections 560 and are placed by the JMS provider 600 onto a message queue 50 within a reserved area 720 of memory. A template-based parsing of received messages is performed 910 by message parser 710 which accesses a stored tree 730 of message parsing templates (which is separate from template parsing of selectors). If a matching message parse template is found in the tree, this template based parse identifies a set of message header/property field names, operators and constants more efficiently than a conventional parse, saving processing for environments that experience large numbers of repetitive messages. Although not shown explicitly in FIG. 5, the template based message parser 710 transfers responsibility to a conventional parsing process if no matching template is found in the message parsing template tree 730.

The above-described message parsing is illustrated below using a simplified example, for a first received message message1 and a subsequently-received message message2.

| message1 | |
| --- | --- |
| M-usr1: | <ZZZ>asd</ZZZ><another>data</another> |
| M-template1: | <ZZZ>$1$</ZZZ><another>$2$</another> |
| M-inMatcher1: | $1$-->ZZZ $2$-->another |
| M-inserts1: | -->M-inMatcher1  $1$=zxc  $2$=data |
| message2 | |
| M-usr2: | <ZZZ>fgh</ZZZ><another>example</another> |
| M-inserts2: | --> input matcher 1  $1$=fgh  $2$=example |

In the above example, M-inMatcher1 shows the relationships between the inserts in M-template1 and the field values with which these inserts are associated. Thus $1$→ZZZ indicates that the first insert ($1$) is associated with the field ZZZ.

Thus, when the second message is received and template parse (M-usr2) is used to find that $1$='gfh', M-inMatcher1 may be used to deduce that ZZZ='fgh', and similarly to deduce in some internal format (represented by [ ]) that the header represents:

M-header2: [ZZZ='fgh', another='example']

Efficient internal representations of both messages and evaluation expressions are created, and are thus able efficiently to evaluate 920 the expression based on the values held in the message by a filter expression evaluator 740. In the messaging example described above, this will involve matching up the header names, such as in the following example:

Opt-code-2: MQCorrelId::def [[ZZZ::vbn]]
M-header2: [ZZZ='fgh', another='example']

The element 'MQCorrelId::def' within Opt-code-2 will be pushed down for processing by the underlying MOM code by reference to a standard message header field (as described above), and need not appear in the 'M-header'. When a message with matching CorrelId is found, the internal expression [[ZZZ=='vbn']] will be evaluated 920 against the internal message header [ZZZ='fgh', another='example']. If the expression evaluates to "true" for an application program, the JMS provider passes the message to the respective application program 10,20.

In a alternative implementation, the field names are eliminated from the process of parsing and matching up the expression and the message header. In particular, the field names are replaced by an index determined from a fixed mapping from field name to field index. For an illustrative example, the mappings may be as follows:

JMSCorrel→?1?, AAA→?2?, ZZZ→?3?, another→?4?, and so on.

Thus the evaluation template:E-evaluation template1:
MQCorrelId::% 1% [[ZZZ='% 2%']]
will be stored as:
E-evaluation_template1: MQCorrelId::% 1% [[?3?='% 2%']]
and will yield:
Opt-code-2: MQCorrelId::def [[?3?::vbn]]
The message matcher template:
M-inMatcher1:$1$→ZZZ $2$→another will be stored as:
M-inMatcher1: $1$→?3?$2$→?4?
And this will yield:
M-header2: [?3?='fgh', ?4?='example']

The field matching (implementable as a hashtable lookup) is thus replaced by index matching. This can be implemented as a simple array lookup.

As noted above, the invention is not limited to evaluation of JMS message selection filters but may be used in the evaluation of other expressions such as conditional transformations implemented by a message broker or a client messaging system. For example, a transformation expression could be expressed in an SQL-like syntax:

SELECT name, price, quantity, total AS price*quantity WHERE name>"M"

The clause 'WHERE name>"M"' acts as a filter, but the expression additionally specifies that the message is to be transformed by calculation of the total value. There is no need to specify 'FROM' since the source is the incoming message stream. In this example, the parsing and preparation (or 'optimization') are the same as that described above for JMS message selection filters, but the final evaluation step where incoming messages are processed against the expression would differ in that the message is changed instead of merely filtering for message selection.

Thus, different types of expressions can benefit from the present invention, where repeated patterns facilitate reuse of stored templates. Different application environments will benefit from a range of different expression preparation steps to achieve optimized expression evaluation templates. However, it is a common feature of many environments that the preparation steps are expensive, and so shortcutting the processing by means of the present invention's reuse of stored parsing templates and expression evaluation templates can provide a valuable reduction in processing overheads.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method in a data processing hardware system including a processor, comprising:
    receiving a data processing instruction including an expression of a particular type;
    parsing the data processing instruction, using a template parser executing on the processor, by comparing the data processing instruction to a plurality of parsing templates; and
    determining, based upon the parsing, whether an evaluation template, from a plurality of evaluation templates, matches the data processing instruction based upon the particular type of the expression, wherein
    the evaluation template defines elements of a first type of expression used to control a conditional data processing operation, and the evaluation template is configured to generate optimized evaluation code for the expression of the first type.

2. The method of claim 1, wherein
the data processing instruction includes a filter expression.

3. The method of claim 1, wherein
the data processing instruction includes a JMS selection filter.

4. The method of claim 1, wherein
the parsing compares the data processing instruction with a parsing template tree,
each of the plurality of parsing templates are respectively associated with individual nodes of the parsing tree, and
each of the plurality of evaluation templates are respectively associated with the individual nodes of the parsing tree.

5. The method of claim 1, further comprising
generating optimized evaluation code, using a matching evaluation template, for the expression of the particular type.

6. The method of claim 5, wherein
the optimized evaluation code is generated by inserting a parameter value, from the expression and identified by the parsing, into the matching evaluation template.

7. A data processing hardware system, comprising:
a processor, wherein the processor is configured to perform and/or initiate the operations of:
receiving a data processing instruction including an expression of a particular type;
parsing the data processing instruction, using a template parser, by comparing the data processing instruction to a plurality of parsing templates; and
determining, based upon the parsing, whether an evaluation template, from a plurality of evaluation templates, matches the data processing instruction based upon the particular type of the expression, wherein
the evaluation template defines elements of a first type of expression used to control a conditional data processing operation, and
the evaluation template is configured to generate optimized evaluation code for the expression of the first type.

8. The system of claim 7, wherein
the data processing instruction includes a filter expression.

9. The system of claim 7, wherein
the data processing instruction includes a JMS selection filter.

10. The system of claim 7, wherein
the parsing compares the data processing instruction with a parsing template tree,
each of the plurality of parsing templates are respectively associated with individual nodes of the parsing tree, and
each of the plurality of evaluation templates are respectively associated with the individual nodes of the parsing tree.

11. The system of claim 7, wherein the processor is further configured to perform and/or initiate the operation of:
generating optimized evaluation code, using a matching evaluation template, for the expression of the particular type.

12. The system of claim 5, wherein
the optimized evaluation code is generated by inserting a parameter value, from the expression and identified by the parsing, into the matching evaluation template.

13. A computer program product comprising a computer usable storage medium having stored therein computer usable program code that, when executed by a data processing hardware system, causes the data processing hardware system to perform:
receiving a data processing instruction including an expression of a particular type;
parsing the data processing instruction, using a template parser executing on the processor, by comparing the data processing instruction to a plurality of parsing templates; and
determining, based upon the parsing, whether an evaluation template, from a plurality of evaluation templates, matches the data processing instruction based upon the particular type of the expression, wherein
the evaluation template defines elements of a first type of expression used to control a conditional data processing operation, and
the evaluation template is configured to generate optimized evaluation code for the expression of the first type.

14. The computer program product of claim 13, wherein
the data processing instruction includes a filter expression.

15. The computer program product of claim 13, wherein
the data processing instruction includes a JMS selection filter.

16. The computer program product of claim 13, wherein
the parsing compares the data processing instruction with a parsing template tree,
each of the plurality of parsing templates are respectively associated with individual nodes of the parsing tree, and
each of the plurality of evaluation templates are respectively associated with the individual nodes of the parsing tree.

17. The computer program product of claim 13, wherein
the computer usable program code further causes the data processing hardware system to perform:
generating optimized evaluation code, using a matching evaluation template, for the expression of the particular type.

18. The computer program product of claim 17, wherein
the optimized evaluation code is generated by inserting a parameter value, from the expression and identified by the parsing, into the matching evaluation template.

* * * * *